United States Patent [19]
Richard et al.

[11] Patent Number: 5,644,430
[45] Date of Patent: Jul. 1, 1997

[54] SINGLE FOLD OPTICAL MAGNIFIER FOR USE IN IMAGE MANIFESTATION APPARATUS

[75] Inventors: Fred V. Richard, Scottsdale; Marc H. Wildy, Phoenix, both of Ariz.

[73] Assignee: Motorola, Schaumburg, Ill.

[21] Appl. No.: 405,057

[22] Filed: Mar. 16, 1995

[51] Int. Cl.$^6$ ................................. G02B 5/18
[52] U.S. Cl. ................. 359/569; 359/570; 359/728; 359/737; 359/900
[58] Field of Search ..................... 359/575, 728, 359/802, 803, 809, 810, 16, 19, 37, 570, 440, 737, 900, 569; 345/32

[56] References Cited

U.S. PATENT DOCUMENTS

| | | | |
|---|---|---|---|
| 2,750,677 | 6/1956 | Wirth | 359/810 |
| 3,575,485 | 4/1971 | Van Buskirk | 359/19 |
| 3,860,329 | 1/1975 | Baker et al. | 359/833 |
| 4,099,851 | 7/1978 | Rethore | 359/737 |
| 4,794,586 | 12/1988 | Korth | 369/215 |
| 4,869,575 | 9/1989 | Kubik | 359/431 |
| 5,035,474 | 7/1991 | Moss et al. | 359/13 |
| 5,044,706 | 9/1991 | Chen | 359/356 |
| 5,075,799 | 12/1991 | Pine et al. | 359/440 |
| 5,161,040 | 11/1992 | Yokoyama et al. | 359/19 |
| 5,323,477 | 6/1994 | Lebby et al. | 385/37 |
| 5,345,336 | 9/1994 | Aoyama et al. | 359/563 |
| 5,483,362 | 1/1996 | Tai et al. | 359/1 |

*Primary Examiner*—Paul M. Dzierzynski
*Assistant Examiner*—John Juba, Jr.
*Attorney, Agent, or Firm*—Eugene A. Parsons

[57] ABSTRACT

A single fold optical magnifier including a plurality of optical elements having an aspheric field flattening light inlet with a light outlet directed at an angle to the inlet and a reflecting surface positioned to direct light from the inlet to the outlet. The optical elements define a light path from the inlet to the outlet with a total average optical length of approximately 15 to 35 millimeters. At least one aspheric surface and one diffractive optical element are positioned in the light path to provide aberration correction, and the optical elements are constructed to angularly magnify images by at least a power of ten.

43 Claims, 2 Drawing Sheets

SINGLE FOLD OPTICAL MAGNIFIER FOR USE IN IMAGE MANIFESTATION APPARATUS

FIELD OF THE INVENTION

The present invention pertains to optical magnifiers and more specifically to optical magnifiers incorporating a single fold in the optical path.

BACKGROUND OF THE INVENTION

With the advent of the communications era, one of the major markets for optical devices is portable electronics equipment, such as cellular telephones, pagers, two-way radios, data banks, computers and the like. Generally, it is desirable that the optical source devices in this type of equipment are compact with low power, inexpensive and include high quality optics with large angular magnification. However, large angular magnification requires a small focal length, as can be seen from the relationship for angular magnifying power (MP) set forth below. Generally, in the discussion below the optical system is treated as a single lens for convenience in describing the relationships.

$$MP = V(b+f)/[f(b+e)]$$

where:

V is a constant, the distance of distinct vision (approximately 10" or 254 mm);

b is the distance from the lens to the virtual image;

e is the distance from the lens to the eye; and f is the effective focal length.

A small effective focal length in turn requires that the optical system have a small F/No., which translates into a fast system in the applications being described. Generally, a fast system is defined as a system with an F/No. less than or equal to approximately 2. As is known in the art, the F/No. is determined by the ratio of the focal length to the diameter of the lens.

Thus, as the focal length is reduced and the system is made smaller, it is inherent that a larger area of the lens, or lens system, is used. This use of a larger area of the lens system results in greater aberration in images transmitted through the system and a need for greater aberration correction. As is well understood by those skilled in the art, greater aberration correction means more elements in the system, which in turn means larger size and greater cost. Therefore, a major problem that is inherent in any attempts to produce compact, inexpensive, high quality optics with large angular magnification is aberration correction.

PRIOR ART

Several different attempts have been made to provide optical systems for portable electronic devices, one of which includes all refractive or reflective optics with a single line of pixels and a vibrating mirror. The single line of pixels is sequenced through the rows of a raster and, simultaneously, the vibrating mirror scans the line of pixels to properly position each subsequent row in its proper orientation. The problem with this system is the high accuracy of timing required, the amount of power used and the blurring of the ultimate image by the vibrations of the mirror. Also, this system is extremely fragile and not conveniently adaptable to the rough use normally occurring in portable equipment.

The system that is normally used at the present time is one using a large image source and either a direct view image or low magnification optics. The major problem with this system is that it greatly limits the size of the portable electronics on which it is used. Basically, the image must be large enough for an operator to read and/or understand the information being displayed. Thus, for example, if one wanted to display an 8.5" by 11" sheet of paper (a standard letter), the direct view display must be 8.5" by 11" to be easily read. Such a display is clearly too large to be incorporated into most portable communications devices, such as pagers, two-way radios, cellular phones and the like.

It would be highly desirable to devise an optical system with the attributes of being compact and inexpensive, and including high quality optics with large angular magnification, while correcting for aberrations.

It is a purpose of the present invention to provide a very small, compact and relatively inexpensive optical magnifier.

It is another purpose of the present invention to provide a very small, compact and relatively inexpensive optical magnifier which includes high quality optics with relatively large angular magnification.

It is still another purpose of the present invention to provide a very small, compact and relatively inexpensive optical magnifier which includes high quality optics with relatively large angular magnification with aberration correction.

It is a further purpose of the present invention to provide a, compact and relatively inexpensive optical magnifier which includes high quality optics with relatively large angular magnification with aberration correction, which is small enough to conveniently fit in portable electronic equipment.

SUMMARY OF THE INVENTION

The above problems and others are substantially solved and the above purposes and others are realized in a single fold optical magnifier including a plurality of optical elements having an inlet with a light outlet directed at an angle to the inlet and a reflecting surface positioned to direct light from the inlet to the outlet. The optical elements define a light path from the inlet to the outlet with a total average optical length of approximately 15 to 35 millimeters. The plurality of optical elements includes at least one aspheric surface to correct for aberration and at least one diffractive optical element positioned in the light path to provide additional aberration correction. The optical elements are constructed to angularly magnify images by at least a power of ten.

The above problems and others are substantially solved and the above purposes and others are further realized in image manifestation apparatus for use in small portable electronics equipment. The image manifestation apparatus includes an image generator with a two dimensional array of light emitting devices formed on a single substrate and driver circuits coupled to the light emitting devices and including a data input terminal. The light emitting devices are individually addressable by the driver circuits so as to generate a real image including one of a plurality of lines of alpha-numerics and graphics from data received at the data input.

A single fold optical magnifier is positioned with an image inlet adjacent the image generator so as to receive the real image generated by the image generator. The magnifier includes a plurality of optical elements having an inlet defining the image inlet of the single fold optical magnifier and a light outlet directed at an angle to the inlet, with a reflecting surface optically positioned between the inlet and the outlet so as to direct light from the inlet to the outlet. The light outlet defines a viewing aperture and the plurality of optical elements produce a virtual image from the real image, which virtual image is viewable at the viewing aperture.

The plurality of optical elements define a light path from the light inlet to the light outlet with a total average optical length in the range of approximately 15 to 35 millimeters. The plurality of optical elements include at least one aspheric surface to correct aberrations and at least one diffractive optical element positioned in the light path so as to provide further aberration correction. The optical elements are constructed to angularly magnify the real image generated by the image generator into a virtual image greater than ten times larger than the real image.

BRIEF DESCRIPTION OF THE DRAWINGS

Referring to the drawings.

DESCRIPTION OF THE PREFERRED EMBODIMENTS

Figure 1:
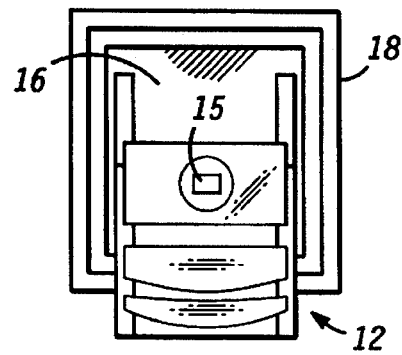
FIG. 1 is a view in top plan of image manifestation apparatus employing a single fold optical magnifier in accordance with the present invention.
Figure 2:
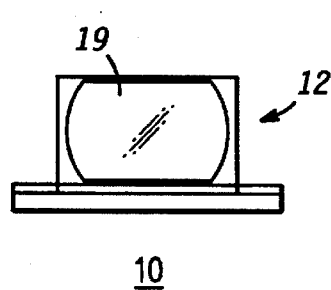
FIG. 2 is a front view of the apparatus illustrated in FIG. 1.
Figure 3:
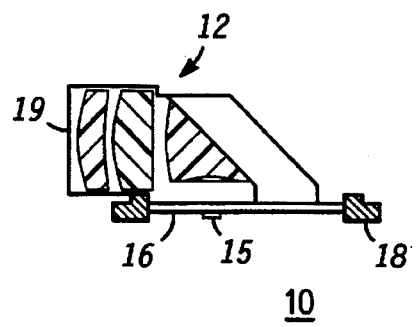
FIG. 3 is a view in side elevation, portions thereof broken away and shown in section, of the apparatus illustrated in FIG. 1.

FIGS. 1, 2 and 3 illustrate a top plan view, front view, and side elevation of miniature image manifestation apparatus 10 incorporating a single fold optical magnifier 12 in accordance with the present invention. FIGS. 1, 2 and 3 illustrate miniature image manifestation apparatus 10 approximately the actual size to provide some indication as to the extent of the reduction in size achieved by the present invention. Apparatus 10 includes an array 15 of light emitting devices, such as organic or inorganic LEDs, field emission devices, vertical cavity surface emitting lasers, LCDs, etc. In this specific embodiment, array 15 includes 144 light emitting devices by 240 light emitting devices. Each light emitting device is fabricated approximately 20 microns on a side with a center-to-center spacing between adjacent devices of no more than 20 microns. Each light emitting device is turned ON with approximately 1.8 volts and utilizes approximately 50 μA of current when it is turned ON. Array 15 produces a luminance less than approximately 15 fL.

Array 15 is mounted on the under-surface of a glass substrate 16 and a driver board 18 is bump-bonded to substrate 16. Additional information on driver boards and bonding of substrates to the driver boards is disclosed in a copending U.S. patent application entitled "Integrated Electro-optical Package", Ser. No. 08/216,995, filed on Mar. 24, 1994 and assigned to the same assignee, which information is included herein by reference.

Single fold optical magnifier 12 is also mounted on substrate 16 and includes a plurality of optical elements defining a light path from array 15 to a viewing aperture 19, best seen in FIG. 2. The plurality of optical elements are constructed to angularly magnify images, generated by array 15, at a light inlet of a first optical element by greater than ten. Because of the length of the optical path and the size of array 15 (the real image), the horizontal field of view of the optics ranges from approximately 11 degrees at a magnification of 10× to 22 degrees at a magnification of 20×, with the present embodiment having a horizontal field of view of approximately 16 degrees and a magnification of 15×.

Figure 4:
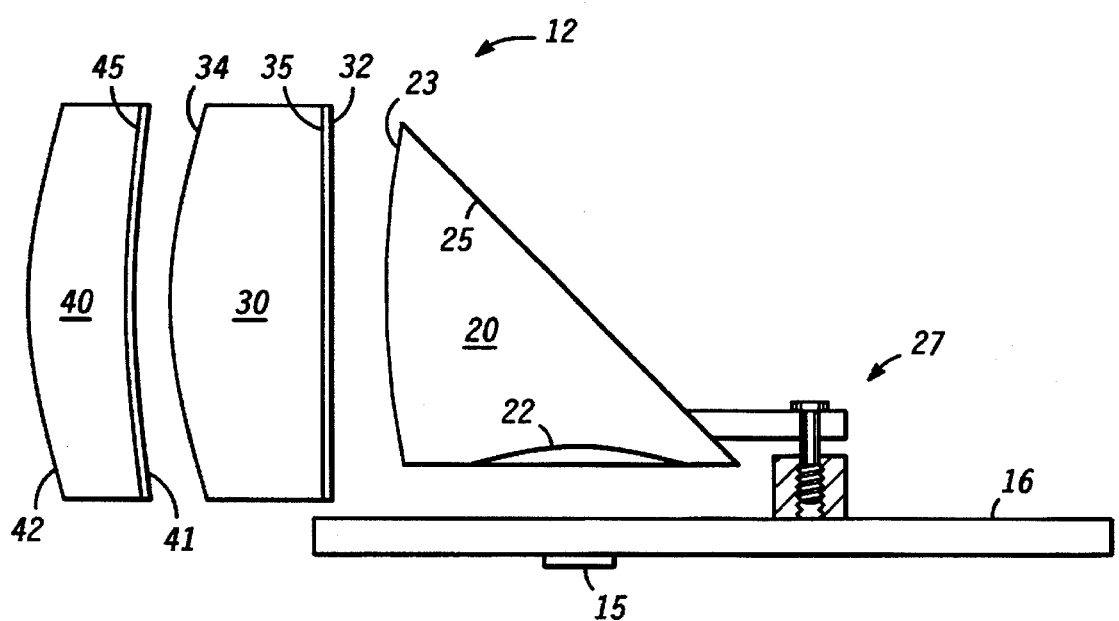
FIG. 4 is a 4× magnified view in side elevation of the apparatus illustrated in FIG. 1.

Referring specifically to FIG. 4, a 4× magnified view in side elevation of portions of apparatus 10 of FIG. 1 is illustrated for clarity. From this view it can be seen that the plurality of optical elements includes a first optical element 20 having a light inlet 22, a spheric surface serving as a light outlet 23 and directed at an angle to light inlet 22 and a reflecting surface 25 optically positioned between light inlet 22 and light outlet 23 so as to direct light from light inlet 22 to light outlet 23. In this specific embodiment, element 20 is formed as a prism and is molded from an optical quality plastic. Generally, it is understood that optical quality plastic is material having a high index of refraction, between approximately 1.5 and 1.6. Reflecting surface 25 may be a separate silvered mirror that is simply molded into element 20, or surface 25 can be silvered after formation of element 20, or surface 25 can be uncoated and used in a total internal reflection mode.

In this embodiment, light inlet 22 takes the form of an aspheric field flattening concave surface molded directly into element 20 and formed as an integral part thereof. It will be understood, however, that light inlet 22 could be formed as a separate lens and subsequently positioned in optical alignment with the lower surface of element 20. Separate components of course result in additional components and assembly steps which can increase the cost and size of the final structure.

Reflecting surface 25 is disposed, with respect to light inlet 22 and light outlet 23, to fold or bend light passing through first element 20 at an angle between approximately 80° to 100°. More specifically, in the embodiment illustrated, light is reflected at an angle of approximately 95°. It has been found, for example, that an angle of 95° avoids vignetting on the lower part of the image at the outlet of optical magnifier 12.

A significant part of the design of first element 20 is the use of a solid, single fold prism with a convex outlet face to enable increased angular magnification (reduced effective focal length) in the same volume of space compared to the use of a simple turning mirror in the air.

In many applications it may be desirable to include apparatus for focusing the final image. To this end, element 20 (and the other elements to be described, if desired) is mounted on substrate 16 by means of a threaded adjustment 27 which can be rotated by a thumb screw, screwdriver, etc., to move the fixed assembly of elements 20, 30 and 40 vertically toward and away from substrate 16 and array 15. Focusing is accomplished by simply changing the distance between light inlet 22 and the image generated on array 15.

The plurality of optical elements further includes an optical lens 30 having a light inlet 32, positioned adjacent light outlet 23 of first optical element 20, and a light outlet 34. In the specific embodiment illustrated, optical lens 30 is a biaspheric optical lens having an aspheric surface defining light inlet 32 and an aspheric surface defining light outlet 34.

Optical lens 30 is fixedly mounted relative to first element 20 by any convenient means including an outer housing (illustrated schematically in FIGS. 1–3), a mounting frame, or any other convenient structure. The aspheric surfaces, including light outlet 34, light inlet 32, light outlet 23 and field flattening light inlet 22 are designed to reduce and/or eliminate any aberration in wavefront as it passes from light inlet 22 to light outlet 34.

The plurality of optical elements, including first element 20 and optical lens 30, define a light path from light inlet 22 of first element 20 to light outlet 34 of optical lens 30. To fabricate a single fold optical magnifier that is useful in portable electronic devices, the total average optical length of the optical path should be in the range of approximately 15 to 35 millimeters. In this embodiment the optical path from light inlet 22 to the aspheric surface defining light outlet 34 is approximately 20 millimeters.

Also, the plurality of optical elements, including first element 20 and optical lens 30, are constructed to include at least one diffractive optical element positioned in the light path so as to provide additional, primarily chromatic (in this embodiment), aberration correction. In the embodiment illustrated, a diffractive optical element 35 is incorporated into the aspheric surface defining light inlet 32. It will of course be understood that diffractive optical elements can, instead or in addition to, be included in any other surface of the plurality of elements in optical magnifier 12. If a diffractive optical element is included in a surface that is substantially normal to the light path, as opposed to those in which the light strikes the surface at an angle, the diffractive optical element is somewhat easier to construct because of rotational symmetry, whereas surfaces on which light strikes at an angle have nonrotational symmetry. Because the aspheric surfaces and diffractive optical element 35 make lens 30 relatively complex, it has been found that fabrication of optical lens 30 is best done by injection molding.

While first element 20 and lens 30 can be constructed to form a complete magnifier, in this specific embodiment, a low power optical lens 40 is included as an example of possible extensions of the magnifier. Optical lens 40 includes a spheric surface 41 which defines a light input and a spheric surface 42 which defines a light output. Also, surface 41 has a diffractive optical element 45 formed in the surface 41 to provide additional aberration correction. Optical lens 40 is mounted adjacent optical lens 30 and forms an outlet optical element that defines an aperture through which the angularly magnified image can be viewed. The addition of optical lens 40 may add somewhat to the size and complexity of magnifier 12, but provides some angular magnification and aberration correction that reduces the complexity of the various other elements, which can in many applications reduce the overall cost of magnifier 12. Because of its low power, lens 40 may also be used as the package window, or viewing aperture. In applications in which only first element 20 and optical lens 30 are utilized, it may be convenient to define the viewing aperture with a glass or plastic window, which may be clear, a light filter, etc.

A typical design specification, or prescription, for the three element magnifier of FIG. 1 is listed below for example only.

|      | RDY         | THI          | RMD  | GLA           | CCY  | THC  | GLC |
|------|-------------|--------------|------|---------------|------|------|-----|
| OBJ: | INFINITY    | −2000.000000 |      |               | 100  | 100  |     |
| STO: | INFINITY    | 35.000000    |      |               | 100  | 100  |     |
| 2:   | 15.72695    | 2.500000     |      | 586000.340000 | 100  | 100  | 100 |
| 3:   | 27.15005    | 1.000000     |      |               | 100  | 100  |     |
| HOE: |             |              |      |               |      |      |     |
| HV1: | REA         | HV2: REA     |      | HOR: 1        |      |      |     |
| HX1: | 0.000000E+00| HY1: 0.000000E+00 | | HZ1: −.18000E+04 |  |      |     |
| CX1: | 100         | CY1          | 100  |               | CZ1  | 100  |     |
| HX2: | 0.000000E+00| HY2: 0.000000E+00 | | HZ2: −.180000E+04 | |     |     |
| CX2: | 100         | CY2:         | 100  |               | CZ2: | 100  |     |
| HWL: | 605.00      | HTO: SPH     |      |               | HCT: | R    |     |
| HCO/HCC |          |              |      |               |      |      |     |
| C1:  | 3.4259E-03  | C2: −7.9305E-07 |   | C3: −1.2095E-07 |    |      |     |
| C1:  | 100         | C2: 100      |      |               | C3:  | 100  |     |
| C4:  | 6.5888E-10  |              |      |               |      |      |     |
| C4:  | 100         |              |      |               |      |      |     |
| 4:   | 15.54395    | 7.000000     |      | 492000.572000 | 100  | 100  | 100 |
| ASP: |             |              |      |               |      |      |     |
| K:   | 0.000000    | KC: 100      |      |               |      |      |     |
| IC:  | YES         | CUF: 0.000000|      | CCF:          |      | 100  |     |
| A:   | −.518075E-04| B: −.442014E-07 |   | C: −.379871E-09 |    |      |     |
| D:   | 0.000000E+00|              |      |               |      |      |     |
| AC:  | 100         | BC: 100      | CC: 100 |           | DC   | 100  |     |
| 5:   | −180.87992  | 0.439871     |      |               | 100  | 100  |     |
| HOE: |             |              |      |               |      |      |     |
| HV1: | REA         | HV2: REA     |      | HOR: 1        |      |      |     |
| HX1: | 0.000000E+00| HY1: 0.000000E+00 | | HZ1: −.18000E+04 |  |      |     |
| CX1: | 100         | CY1          | 100  |               | CZ1  | 100  |     |
| HX2: | 0.000000E+00| HY2: 0.000000E+00 | | HZ2: −.180000E+04 | |     |     |
| CX2: | 100         | CY2:         | 100  |               | CZ2: | 100  |     |
| HWL: | 605.00      | HTO: ASP     |      |               | HCT: | R    |     |
| HCO/HCC |          |              |      |               |      |      |     |
| C1:  | −7.6033E-03 | C2  4.1511E-05 |    | C3: −4.7167E-07 |    |      |     |
| C1:  | 100         | C2: 100      |      | C3:           |      | 100  |     |
| C4:  | 2.5018E-09  | C67: −4.9807E-05 |  | C68: 1.3538E-06 |    |      |     |
| C4:  | 100         | C67: 100     |      | C68:          |      | 100  |     |
| C69: | −7.3037E-09 |              |      |               |      |      |     |
| C69: | 100         |              |      |               |      |      |     |
| 6:   | 20.00000    | 7.511300     |      | 492000.572000 | 100  | 100  | 100 |
| 7:   | 1.0000E+11  | 5.540301     | REFL | 492000.572000 | 100  | 100  | 100 |

-continued

|  |  |  |  |  |  |  |  |  |  |
|---|---|---|---|---|---|---|---|---|---|
| XDE: |  | 0.000000 | YDE: | 0.000000 |  | ZDE: | 0.000000 | BEN |  |
| XDC: | 100 |  | YDC: | 100 |  | ZDC: | 100 |  |  |
| ADE: |  | 47.500000 | BDE: | 0.000000 |  | CDE: | 0.000000 |  |  |
| ADC: | 100 |  | BDC: | 100 |  | CDC: | 100 |  |  |
| 8: | −67.54867 |  |  | −0.839287 |  |  |  | 100 | 100 |
| 9: | INFINITY |  |  | 0.000000 |  |  |  | 100 | 100 |
| 10: | INFINITY |  |  | −0.900000 |  | 523000.550000 |  | 100 | 100 | 100 |
| 11: | INFINITY |  |  | −0.030000 |  | 520000. 550000 |  | 100 | 100 | 100 |
| 12: | INFINITY |  |  | 0.000591 |  |  |  | 100 | PIM |
| IMG: | INFINITY |  |  | 0.000000 |  |  |  | 100 | 100 |

Here it should be noted that because of the very small magnifier 12 and array 15 and the fact that a virtual image is utilized, rather than a direct view display, the overall physical dimensions of miniature image manifestation apparatus 10 are approximately 1.5 inches (3.8 cm) wide by 0.75 inches (1.8 cm) high by 1.75 inches (4.6 cm) deep, or a total volume of approximately 2 cubic inches (32 cm$^3$), of which less than 0.7 cubic inches is the optic volume.

Figure 5:
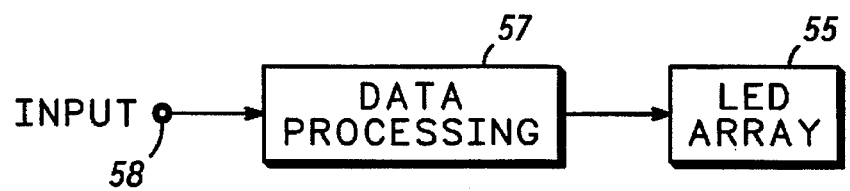
FIG. 5 is a simplified block diagram of an image generator associated with the apparatus of FIG. 1.

Array 15 is illustrated in more detail in FIG. 5 and includes, for example, semiconductor electronics such as a light emitting device (LED) array 55 driven by data processing circuits 57. The LEDs may be, for example, organic or inorganic light emitting diodes, vertical cavity surface emitting lasers, field emission devices, etc. Data processing circuits 57 include, for example, logic and switching circuit arrays for controlling each LED in LED array 35, drivers and the like. Data processing circuits 57 include, in addition to or instead of the logic and switching arrays, a microprocessor or similar circuitry for receiving data at an input terminal 58 and processing the data to produce a desired real image on a device such as LED array 55.

Figure 6:
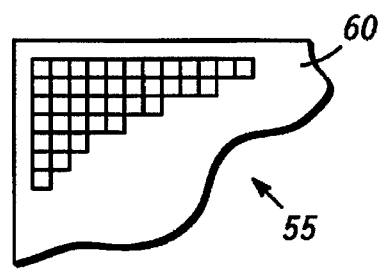
FIG. 6 is an enlarged view in top plan of an array of light emitting devices, portions thereof broken away, forming a portion of the image generator of FIG. 5.

In this specific embodiment LED array 55 is utilized because of the extremely small size that can be achieved and because of the simplicity of construction and operation. Referring specifically to FIG. 6, a plan view of LED array 55 is illustrated in which pixels are formed in a regular pattern of rows and columns on a single substrate (e.g. a semiconductor chip) 60. Each pixel includes at least one LED, with additional parallel LEDs being included, if desired, for color, additional brightness and/or redundancy. By addressing specific pixels by row and column in a well known manner, the specific pixels are energized to produce a real image. Digital or analog data is received at input terminal 58 and converted by data processing circuits 57 into signals capable of energizing selected pixels to generate the predetermined real image. The digital or analog data is received from any data source, such as a communication receiver, a memory or data bank, or other portable electronic device, etc.

It will be understood by those skilled in the art that LED array 55 and substrate 60 are greatly enlarged in FIG. 6. Also, while data processing circuits 57 are represented by a separate block, it will be understood that in some applications they may be formed around the edge of array 55 on substrate 60. The actual size of substrate 60 is on the order of a few milli-meters (e.g. 3 to 10) along each side with each LED being on the order of 5 to 50 microns on a side (or in diameter if the LED is round). Because of the extremely small size of substrate 60, drive lines or metal connecting traces between LEDs, have a very small cross-section, which severely limits their current carrying capacity, or current density. Referring to FIG. 6 for example, in one typical operation only a row at a time is addressed or "turned ON". Thus, the metal trace for each column needs to carry only sufficient current for one LED (the one LED in the row which is ON). However, all of the LEDs in the ON row could potentially be turned ON simultaneously. Thus, the metal trace for the ON row, which can potentially be required to carry current for however many LEDs are in the row (e.g. 100 to 1500 LEDs), must carry many times as much current as the column metal traces.

Referring again to FIG. 4, the operation of miniature image manifestation apparatus 10 will be described generally. Array 15 of apparatus 10 provides a real image source at the lower surface of substrate 16. The aspheric field flattening concave surface defining light inlet 22 is positioned in spaced relation to substrate 16 and generally flattens the image, to correct some aberration problems, and spreads the light across the surface of reflecting surface 25. Surface 25 reflects the light through light outlet 23 and onto light inlet 32 of optical lens 30. As the light passes through the spheric surface defining light outlet 23, less aberration is introduced than in a plano surface. Diffractive optical element 35 is specifically designed to correct additional, primarily chromatic, aberration and the aspherical surface defining light inlet 32 corrects and/or balances more aberration. Optical lens 30 provides the primary angular magnification and the aspherical surface defining light outlet 34 corrects and/or balances more aberration.

If optical lens 40 is included in the apparatus, diffractive optical element 45 and/or an aspherical surface 41 can be included to correct for additional aberration. Optical lens 40 also provides a small amount of additional angular magnification. Surface 42, defining the viewing aperture of the apparatus, can be an aspherical surface to further correct aberration if desired. Depending upon the application, magnification and optical path length, the optical elements for the magnifier generally include at least one aspherical surface and at least one diffractive optical element in the light path. In some special applications it may be possible to use all aspherical surfaces and no diffractive optical elements and in some very special applications it may be possible to use only diffractive optical elements to correct aberration. It should be noted, in any case, that the present invention allows aberration correction to be enhanced through the use of aspheric and diffractive structures, sometimes on the same surface, thus avoiding additional conventional elements. It should also be noted that in order to economically form the aspheric and/or diffractive optical elements on the small surfaces of the optical elements that it is generally necessary to mold the optical elements.

Figure 7:
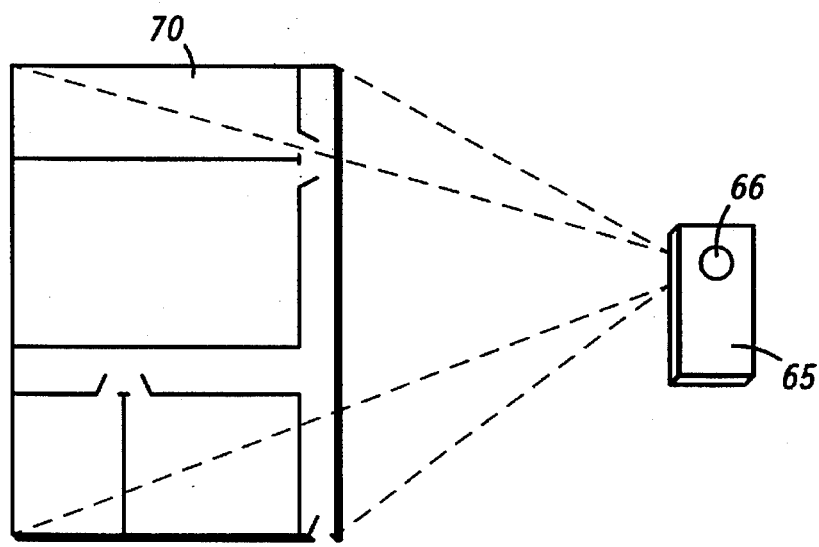
FIG. 7 is a view in perspective illustrating a typical view as seen by the operator of portable communications equipment employing the image manifestation apparatus of FIG. 1.

Referring to FIG. 7, a perspective view of portable, or hand-held, electronics equipment 65 is illustrated with miniature image manifestation apparatus mounted therein so that only a viewing aperture 66 is visible. FIG. 7 further illustrates a typical view 70 seen by an operator looking into viewing aperture 66 of electronics equipment 65, which view 70 appears to be behind electronics equipment 65. View 70 could be, for example, a floor plan of a building about to be entered by the operator (a policeman). The floor plan is on file at the police station and, when assistance is requested by the policeman, the station simply transmits the previously recorded plan. Similarly, electronics equipment 65 might be utilized to transmit pictures of missing persons or wanted criminals, maps, extremely long messages, etc. Many other variations, such as silent receiver operation wherein the message appears in viewing aperture 66 instead of audibly, are possible.

Thus, an optical system with the attributes of being compact and inexpensive, and including high quality optics with large angular magnification, while correcting for aberrations, has been disclosed. Because of its novel construction, magnifier 12 can be manufactured very small, with high angular magnification and very inexpensively. Also, while injection molding the various optical elements to incorporate the diffractive optical elements and/or the aspherical surfaces is considered the optimum manufacturing method, it is also the least expensive. Further, because of the small size, high angular magnification and rugged construction of magnifier 12, magnifier 12 can be used in conjunction with miniature image manifestation apparatus 10 and/or in virtually any portable electronics equipment.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. A single fold optical magnifier comprising:
   a light inlet and a light outlet directed at an angle to the inlet;
   a reflecting surface optically positioned between the inlet and the outlet so as to direct light from the inlet to the outlet;
   a plurality of optical elements positioned between the inlet and the outlet and including at least one aspheric surface for aberration correction;
   the plurality of optical elements defining a light path from the light inlet to the light outlet with a total average optical length in the range of approximately 15 to 30 millimeters;
   at least one diffractive optical element positioned in the light path so as to provide further aberration correction; and
   the plurality of optical elements being constructed to angularly magnify an image source at the light inlet of the first optical element by greater than ten.

2. A single fold optical magnifier as claimed in claim 1 wherein the light outlet is directed at an angle to the inlet in a range of approximately 80° to 100°.

3. A single fold optical magnifier as claimed in claim 2 wherein the light outlet is directed at an angle of approximately 95° to the inlet.

4. A single fold optical magnifier as claimed in claim 1 wherein the total average optical length of the light path is approximately 20 millimeters.

5. A single fold optical magnifier as claimed in claim 1 wherein the plurality of optical elements define a horizontal field of view greater than approximately 11 degrees.

6. A single fold optical magnifier as claimed in claim 1 wherein the plurality of optical elements is constructed to angularly magnify an image source at the light inlet of the plurality of optical elements by approximately fifteen.

7. A single fold optical magnifier as claimed in claim 6 wherein the plurality of optical elements define a horizontal field of view approximately 16 degrees.

8. A single fold optical magnifier as claimed in claim 1 wherein the plurality of optical elements includes a first optical element having an aspheric field flattening light inlet.

9. A single fold optical magnifier as claimed in claim 8 wherein the plurality of optical elements includes a first optical element having an aspheric light outlet directed at an angle to the inlet and a reflecting surface optically positioned between the inlet and the outlet so as to direct light from the inlet to the outlet.

10. A single fold optical magnifier as claimed in claim 9 wherein the first optical element is a prism with the aspheric field flattening light inlet formed in one side thereof and a reflecting surface formed on a second side thereof.

11. A single fold optical magnifier as claimed in claim 1 wherein the plurality of optical elements includes a biaspheric optical lens having an aspheric light inlet and an aspheric light outlet, positioned at an intermediate portion of the light path.

12. A single fold optical magnifier as claimed in claim 11 wherein the biaspheric optical lens has a diffractive optical element formed on the aspheric light inlet.

13. A single fold optical magnifier as claimed in claim 1 wherein the plurality of optical elements includes an outlet optical element having a light inlet and a light outlet defining a viewing aperture, the light outlet of the outlet optical element defining an end of the optical path.

14. A single fold optical magnifier as claimed in claim 13 wherein the outlet optical element has a diffractive optical element formed on the light inlet thereof.

15. A single fold optical magnifier comprising:
   a first optical element having an aspheric field flattening light inlet, a light outlet directed at an angle to the inlet and a reflecting surface optically positioned between the inlet and the outlet so as to direct light from the inlet to the outlet;
   an optical lens having a light inlet, positioned adjacent the light outlet of the first optical element, and a light outlet;
   the first optical element and the optical lens defining a light path from the light inlet of the first optical element to the light outlet of the optical lens with a total average optical length in the range of approximately 15 to 30 millimeters and angularly magnifying an image source at the light inlet of the first optical element by greater than ten; and
   at least one aspherical surface on one of the first optical element and the optical lens and in the light path so as to provide aberration correction.

16. A single fold optical magnifier as claimed in claim 15 including in addition at least one diffractive optical element positioned on one of the optical lens light inlet, the optical lens light outlet, or the light inlet or outlet of the first optical element and in the light path so as to provide aberration correction.

17. A single fold optical magnifier comprising:
   a first optical element having an aspheric field flattening light inlet, an aspheric light outlet directed at an angle to the inlet and a reflecting surface optically positioned between the inlet and the outlet so as to direct light from the inlet to the outlet;
   a biaspheric optical lens having an aspheric light inlet, positioned adjacent the light outlet of the first optical element, and an aspheric light outlet, the aspheric field flattening light inlet, the aspheric light outlet of the first optical element, and the aspheric light inlet and outlet of the biaspheric optical lens providing aberration correction;

the first optical element and the biaspheric optical lens defining a light path from the light inlet of the first optical element to the light outlet of the biaspheric optical lens with a total average optical length in the range of approximately 15 to 30 millimeters and angularly magnifying an image source at the light inlet of the first optical element by greater than ten; and at least one diffractive optical element positioned on one of the biaspheric optical lens light inlet, the biaspheric optical lens light outlet, or the light outlet of the first optical element and in the light path so as to provide further aberration correction.

18. A single fold optical magnifier as claimed in claim 17 wherein the light outlet of the first optical element is directed at an angle to the light inlet of the first optical element in a range of approximately 80° to 100°.

19. A single fold optical magnifier as claimed in claim 18 wherein the light outlet of the first optical element is directed at an angle of approximately 95° to the light inlet of the first optical element.

20. A single fold optical magnifier as claimed in claim 17 wherein the total average optical length of the light path is approximately 20 millimeters.

21. A single fold optical magnifier as claimed in claim 17 wherein the first optical element and the biaspheric lens is constructed to angularly magnify image sources at the light inlet of the first optical element by approximately fifteen.

22. A single fold optical magnifier as claimed in claim 17 including in addition an outlet optical element having a light inlet positioned adjacent the light outlet of the biaspheric optical lens and a light outlet defining a viewing aperture.

23. A single fold optical magnifier as claimed in claim 22 wherein the outlet optical element includes a second lens with an aspheric surface.

24. A method of manufacturing a single fold optical magnifier comprising the steps of:

forming a first optical element including an optical prism having a light inlet formed in a first surface, a second surface formed as a light outlet and directed at an angle to the light inlet, and a reflecting surface optically positioned between the inlet and the outlet and joining the first and second surfaces so as to direct light from the inlet to the outlet;

forming an aspheric field flattening concave surface in the first surface of the first optical element as the light inlet;

forming an optical lens having a light inlet, positioned adjacent the light outlet of the first optical element, and an opposed light outlet; and mounting the first optical element and the optical lens to define a light path from the light inlet of the first optical element to the light outlet of the outlet optical element, the steps of forming further including forming at least one aspherical surface on one of the first optical element and the optical lens, the aspherical surface being positioned in the light path to correct for aberration.

25. A method of manufacturing a single fold optical magnifier as claimed in claim 24 including in addition a step of forming at least one diffractive optical element on a surface of one of the first optical element and the optical lens and in the light path so as to provide further aberration correction.

26. A method of manufacturing a single fold optical magnifier as claimed in claim 24 wherein the step of forming the first optical element includes forming an aspheric convex surface as the second surface of the first optical element to define the light output.

27. A method of manufacturing a single fold optical magnifier as claimed in claim 24 wherein the step of forming the optical lens includes forming an aspheric convex surface defining the light inlet and an aspheric convex surface defining the light outlet.

28. A method of manufacturing a single fold optical magnifier as claimed in claim 24 wherein the steps of forming the first optical element and forming the optical lens includes injection molding the first optical element and the optical lens.

29. A method of manufacturing a single fold optical magnifier as claimed in claim 28 wherein the step of injection molding the optical lens includes injection molding a diffractive optical element on the light inlet of the optical lens.

30. Image manifestation apparatus comprising;

an image generator including a two dimensional array of light emitting devices formed on a single substrate and driver circuits coupled to the light emitting devices and including a data input terminal, the light emitting devices being individually addressable by the driver circuits so as to generate a real image including one of a plurality of lines of alpha-numerics and graphics from data received at the data input; and a single fold optical magnifier having an image inlet positioned adjacent the image generator so as to receive the real image generated by the image generator, the magnifier including a plurality of optical elements having a light inlet defining the image inlet of the single fold optical magnifier and a light outlet directed at an angle to the light inlet, with a reflecting surface optically positioned between the light inlet and the light outlet so as to direct light from the light inlet to the night outlet, the light outlet defining a viewing aperture and the plurality of optical elements producing a virtual image, viewable at the viewing aperture, from the real image, the light inlet of the plurality of optical elements including an aspheric field flattening optical surface;

the plurality of optical elements defining a light path from the light inlet to the light outlet with a total average optical length in the range of approximately 15 to 30 millimeters, at least one aspherical surface on one of the first optical element and the optical lens and positioned in the light path to correct for aberration; and at least one diffractive optical element positioned in the light path so as to provide additional aberration correction; and the plurality of optical elements being constructed to angularly magnify the real image generated by the image generator into a virtual image greater than ten times larger than the real image.

31. Image manifestation apparatus as claimed in claim 30 wherein the light outlet of the plurality of optical elements is directed at an angle to the light inlet of the plurality of optical elements in a range of approximately 80° to 100°.

32. Image manifestation apparatus as claimed in claim 31 wherein the light outlet is directed at an angle of approximately 95° to the inlet.

33. Image manifestation apparatus as claimed in claim 30 wherein the total average optical length of the light path is approximately 20 millimeters.

34. Image manifestation apparatus as claimed in claim 30 wherein the plurality of optical elements are constructed to define a horizontal field of view greater than approximately 11 degrees.

35. Image manifestation apparatus as claimed in claim 30 wherein the plurality of optical elements are constructed to angularly magnify images at the light inlet of the first optical element by approximately fifteen.

36. Image manifestation apparatus as claimed in claim 35 wherein the plurality of optical elements are constructed to define a horizontal field of view of approximately 16 degrees.

37. Image manifestation apparatus as claimed in claim 30 wherein the plurality of optical elements includes a first optical element having an aspheric field flattening light inlet, an aspheric light outlet directed at an angle to the inlet and a reflecting surface optically positioned between the inlet and the outlet so as to direct light from the inlet to the outlet.

38. Image manifestation apparatus as claimed in claim 30 wherein the single fold optical magnifier is mounted with limited movement of the image input toward and away from the two dimensional array of light emitting devices so as to provide focusing of the virtual image in the viewing aperture.

39. Image manifestation apparatus as claimed in claim 30 wherein the first optical element is a prism with an aspheric field flattening light inlet formed in one side thereof and a mirrored surface formed on a second side thereof.

40. Image manifestation apparatus as claimed in claim 30 wherein the plurality of optical elements includes a biaspheric optical lens having an aspheric light inlet and an aspheric light outlet, positioned at an intermediate portion of the light path.

41. Image manifestation apparatus as claimed in claim 40 wherein the biaspheric optical lens has a diffractive optical element formed on the aspheric light inlet.

42. Image manifestation apparatus as claimed in claim 30 wherein the plurality of optical elements includes an outlet optical element having a light inlet and a light outlet defining a viewing aperture, the light outlet of the outlet optical element defining an end of the optical path.

43. Image manifestation apparatus as claimed in claim 42 wherein the outlet optical element has a diffractive optical element formed on the light inlet thereof.

* * * * *